(12) United States Patent
Zuo et al.

(10) Patent No.: US 10,467,977 B2
(45) Date of Patent: Nov. 5, 2019

(54) DISPLAY PANEL AND DRIVING CIRCUIT THEREOF

(71) Applicant: Wuhan China Star Optoelectronics Technology Co., Ltd., Wuhan, Hubei (CN)

(72) Inventors: Qingcheng Zuo, Guangdong (CN); Xiaoping Tan, Guangdong (CN); Chun-hung Huang, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 0 days.

(21) Appl. No.: 15/112,137

(22) PCT Filed: May 12, 2016

(86) PCT No.: PCT/CN2016/081779
§ 371 (c)(1),
(2) Date: Jul. 15, 2016

(87) PCT Pub. No.: WO2017/152487
PCT Pub. Date: Sep. 14, 2017

(65) Prior Publication Data
US 2018/0108319 A1 Apr. 19, 2018

(30) Foreign Application Priority Data
Mar. 9, 2016 (CN) .......................... 2016 1 0134370

(51) Int. Cl.
G09G 3/36 (2006.01)
G02F 1/1362 (2006.01)

(52) U.S. Cl.
CPC ..... *G09G 3/3688* (2013.01); *G02F 1/136286* (2013.01)

(58) Field of Classification Search
CPC .................. G09G 3/3688; G02F 1/136286
See application file for complete search history.

(56) References Cited

U.S. PATENT DOCUMENTS

| 2005/0156862 A1* | 7/2005 | Hirayama | G09G 3/3677 345/100 |
| 2007/0091050 A1* | 4/2007 | Katayama | G09G 3/3688 345/98 |
| 2012/0026151 A1* | 2/2012 | Kim | G09G 3/3614 345/212 |

FOREIGN PATENT DOCUMENTS

| CN | 1469339 A | 1/2004 |
| CN | 101777328 A | 7/2010 |

(Continued)

Primary Examiner — Kevin M Nguyen
(74) Attorney, Agent, or Firm — Andrew C. Cheng

(57) ABSTRACT

A driving circuit for a display panel is disclosed. The driving circuit includes at least a driving signal line connected to a display driving signal transmission unit delivering display driving signal produced by the display driving signal transmission unit to sub-pixels of the display panel through the driving signal line; and a number of data signal lines connected to a display data provision unit delivering display data signal produced by the display data provision unit to the sub-pixels. For each subset of the sub-pixels that are of a same component color, at least two data signal lines, starting from different points of time, deliver display data signal to the subset of sub-pixels that are of the same component color. The driving circuit effectively resolves glitches to input signal resulted from heavy transient load to the input signal.

2 Claims, 2 Drawing Sheets

(56) References Cited

FOREIGN PATENT DOCUMENTS

| | | | |
|---|---|---|---|
| CN | 102750919 | A | 10/2012 |
| CN | 102819159 | A | 12/2012 |
| CN | 104867468 | A | 8/2015 |
| CN | 105161069 | A | 12/2015 |
| CN | 105575354 | A | 5/2016 |
| JP | 2003108102 | A | 4/2003 |
| KR | 10-0563285 | B1 | 3/2006 |
| TW | I314716 | B | 9/2009 |

* cited by examiner

DISPLAY PANEL AND DRIVING CIRCUIT THEREOF

BACKGROUND OF THE INVENTION

1. Field of the Invention

The present disclosure relates to display technologies, and in particular to a driving circuit for a display panel.

2. The Related Arts

The demand for liquid crystal display (LCD) is continuously increasing, and people are asking for even greater resolution and better display quality. Therefore, how to improve LCD display quality becomes a major issue.

Existing LCDs are internally structurally as shown in FIG. 1, where a driving circuit for multiple sub-pixels of different component colors in a row of pixel units is depicted. The pixel units are denoted as S(1)~S(2N), and each pixel unit includes three sub-pixels of three component colors. The sub-pixel of component color red is denoted as R, the sub-pixel of component color green is denoted as G, and the sub-pixel of component color blue is denoted as B. GATE(N) is the driving signal line providing driving signals for the sub-pixels in a row of pixel units. MUXR, MUXG, and MUXB are data signal lines providing data signals for R, G, and B sub-pixels, respectively. For existing multiplexer (MUX) driving structure, there are 1:2 MUX (2:4 MUX) type or 1:3 MUX (2:6 MUX) type. The driving structure shown in FIG. 1 is 1:3 MUX type.

Existing LCDs work as follows. When driving signal line GATE(N) is raised from low-level to high-level and as such provides voltage to the gates of MOS transistors connected to GATE(N). The MOS transistors are conducted and, after a preset period T1, the data signal line MUXR is raised to high level. Then, all thin film transistors (TFTs) that are connected to the R sub-pixels in a row of pixel units are conducted (i.e., T01, T04, T07, and T10 in FIG. 1 are conducted simultaneously), and all R sub-pixels corresponding to the row actuated by GATE(N) are charged. In other words, data signal line MUXR provides data signals to all R sub-pixels in a row of pixel units.

Similarly, after charging to all R sub-pixels corresponding to the row actuated by GATE(N) are done, data signal line MUXR is lowered to low level. After a preset period T2, the data signal line MUXG is raised to high level. Then, all TFTs that are connected to the G sub-pixels in a row of pixel units are conducted (i.e., T02, T05, T08, and T11 in FIG. 1 are conducted simultaneously), and all G sub-pixels corresponding to the row actuated by GATE(N) are charged.

After charging to all G sub-pixels corresponding to the row actuated by GATE(N) are done, data signal line MUXG is lowered to low level. After a preset period T3, the data signal line MUXB is raised to high level. Then, all TFTs that are connected to the B sub-pixels in a row of pixel units are conducted (i.e., T03, T06, T09, and T12 in FIG. 1 are conducted simultaneously), and all B sub-pixels corresponding to the row actuated by GATE(N) are charged.

After charging to all B sub-pixels corresponding to the row actuated by GATE(N) are done, data signal line MUXB is lowered to low level. After a preset period T4, the driving signal line GATE(N) is lowered to low level, and the cycle of a row's charging is completed. Repeating the above process then can complete the entire LCD's charging.

FIG. 2 is a timing sequence diagram showing the driving signal line GATE(N), data signal lines MUXR, MUXG, and MUXB of the LCD of FIG. 1. As illustrated, during a high-level cycle of GATE(N), MUXR, MUXG, and MUXB sequentially charge sub-pixels of corresponding component colors, respectively.

FIG. 3 is a waveform diagram showing the actual waveforms of the driving signal line GATE(N), data signal lines MUXR, MUXG, and MUXB of the LCD of FIG. 1. As illustrated, when the data signal line MUXR (or MUXG, or MUXB) starts charging sub-pixels of corresponding component color, liquid crystal module (LCM) instantaneously becomes a greater loading to the driving IC of the LCD. As such, glitches as shown in FIG. 3 appear in the output of the driving IC, i.e., the actual input signal to MOS transistors (Gate driver On Array, GOA). The actual input signal can be the clock (CK) signal, a frame start signal (STV), RESET signal, etc.

SUMMARY OF THE INVENTION

Therefore, the present disclosure teaches a driving circuit for a display panel that resolves the problem of glitches appearing in the actual input signal of GOA when data signal lines of the display panel charge sub-pixels of different component colors.

The display panel includes a number of pixel units arranged in a pixel unit array. Each pixel unit includes a number of sub-pixels of different component colors. The driving circuit includes, for the sub-pixels in a row of pixel units, at least a driving signal line connected to a display driving signal transmission unit delivering display driving signal produced by the display driving signal transmission unit to the sub-pixels through the driving signal line, and a number of data signal lines connected to a display data provision unit delivering display data signal produced by the display data provision unit to the sub-pixels. For each subset of the sub-pixels that are of a same component color, at least two data signal lines, starting from different points of time, deliver display data signal to the subset of sub-pixels that are of the same component color.

Specifically, each subset of the sub-pixels that are of a same component color are divided into at least two groups of sub-pixels. The number of data signal lines is identical to the number of groups divided. Each of the at least two data signal lines delivers display data signal to one of the at least two groups of sub-pixels.

Specifically, the at least two data signal lines delivers display data signal to the at least two groups of sub-pixels starting at respective points of time with a preset gap therebetween.

Specifically, the at least two data signal lines delivers display data signal to the at least two groups of sub-pixels with respective and overlapped charging periods.

Specifically, the data signal lines deliver display data signal to subsets of the sub-pixels that are of different component colors with respective and non-overlapped charging periods.

The driving circuit resolves glitches resulted from heavy transient load to input signal, thereby enhancing the quality of the input signal and the display quality as well.

The above driving method conducts contact detection while displaying images so that, within a display scan cycle, the times for image display and for contact detection, respectively, are not shortened. As such, the image display and contact detection performances of an Incell LCD panel are both guaranteed.

BRIEF DESCRIPTION OF THE DRAWINGS

To make the technical solution of the embodiments according to the present disclosure, a brief description of the drawings that are necessary for the illustration of the embodiments will be given as follows. Apparently, the drawings described below show only example embodiments of the present disclosure and for those having ordinary skills in the art, other drawings may be easily obtained from these drawings without paying any creative effort. In the drawings.

DETAILED DESCRIPTION OF THE PREFERRED EMBODIMENTS

The present disclosure teaches a driving method for display panels that include a pixel unit array having multiple pixel units arranged in an array. Each pixel unit includes sub-pixels of different component colors.

For the sub-pixels in a row of pixel units of the display panel, the driving circuit includes at least a driving signal line connected to a display driving signal transmission unit which delivers the display driving signal produced by the display driving signal transmission unit to the sub-pixels through the driving signal line. The driving circuit also includes multiple data signal lines connected to a display data provision unit which delivers display data produced by the display data signal produced by the display data provision unit to the sub-pixels through the data signal lines. At least two of the data signal lines are for the sub-pixels of a same component color. The two data signal lines delivers display data signal to the sub-pixels of the same component color starting from different points of time.

By using at least two data signal lines to deliver display data signal to the sub-pixels of the same component color in a row of pixel units can effectively reduce the transient load of data signal lines when charging the sub-pixels of each component color, thereby avoiding the glitches in the input signal.

Figure 4:
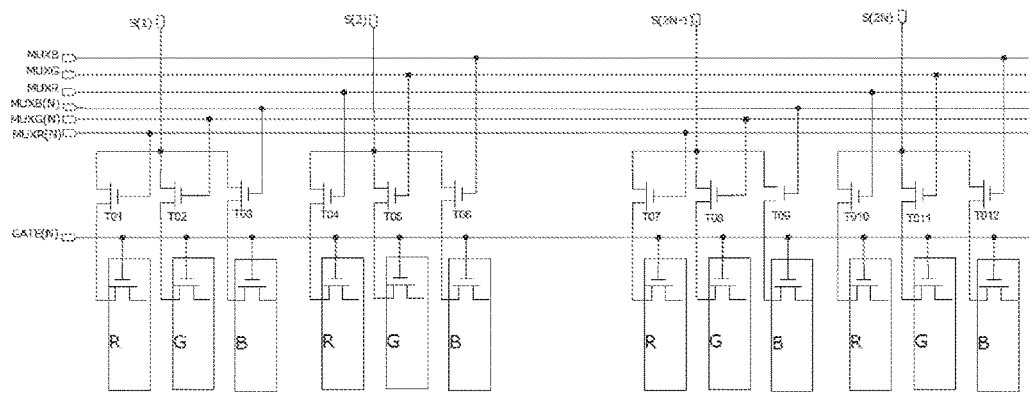
FIG. 4 is a schematic diagram showing a driving circuit for the sub-pixels of different component colors in a row of pixel units of a display panel according to an embodiment of the present disclosure.

Assuming that each pixel unit include a sub-pixel R of component color red, a sub-pixel G of component color green, and a sub-pixel B of component color blue, FIG. 4 is a schematic diagram showing a driving circuit for the sub-pixels of different component colors in a row of pixel units of a display panel according to an embodiment of the present disclosure.

As illustrated, the driving circuit is of the 1:3 MUX type. The row of pixel units are denoted as S(1)~S(2N), GATE(N) is the driving signal line providing driving signals for the sub-pixels in the row of pixel units, and MUXR, MUXR(N), MUXG, MUXG(N), MUXB, MUXB(N) are data signal lines, providing data signals for R, G, and B sub-pixels, respectively. MUXR and MUXR(N) are data signal lines for all R sub-pixels in the row of pixel units. That is, MUXR and MUXR(N) jointly charge all R sub-pixels in the row of pixel units. MUXG and MUXG(N) are data signal lines for all G sub-pixels in the row of pixel units. That is, MUXG and MUXG(N) jointly charge all G sub-pixels in the row of pixel units. MUXB and MUXB(N) are data signal lines for all B sub-pixels in the row of pixel units. That is, MUXB and MUXB(N) jointly charge all B sub-pixels in the row of pixel units.

As illustrated in FIG. 4, the sub-pixels of a same component color in the row of pixel units are divided into at least two groups where a group of sub-pixels are serviced by one of the data signal lines. The number of data signal lines is therefore identical to the number of groups divided.

As illustrated, R sub-pixels are divided into two groups: a first group including those denoted as T01 and T07, and a second group denoted as T04 and T10. Data signal line MUXR charges the second group of sub-pixels T04 and T10, and data signal line MUXR(N) charges the first group of sub-pixels T01 and T07.

Similarly, G sub-pixels are divided into two groups: a third group including those denoted as T02 and T08, and a fourth group denoted as T05 and T11. Data signal line MUXG charges the fourth group of sub-pixels T05 and T11, and data signal line MUXG(N) charges the third group of sub-pixels T02 and T08.

Similarly, B sub-pixels are divided into two groups: a fifth group including those denoted as T03 and T09, and a sixth group denoted as T06 and T12. Data signal line MUXB charges the sixth group of sub-pixels T06 and T12, and data signal line MUXB(N) charges the fifth group of sub-pixels T03 and T09.

The data signal lines MUXR, MUXR(N), MUXG, MUXG(N), MUXB, MUXB(N) charge the corresponding sub-pixels as follows.

When driving signal line GATE(N) is raised from low-level to high-level and as such provides voltage to the gates of MOS transistors connected to GATE(N). The MOS transistors are conducted and, after a preset period T1, the data signal line MUXR is raised to high level. Then, all thin film transistors (TFTs) that are connected to the R sub-pixels of the second group in the row of pixel units are conducted (i.e., T04 and T10 in FIG. 4 are conducted simultaneously), and these R sub-pixels are charged. In other words, data signal line MUXR provides data signals to all R sub-pixels of the second group in the row of pixel units.

After a preset period ΔT, the data signal line MUXR(N) is raised to high level. Then, all thin film transistors (TFTs) that are connected to the R sub-pixels of the first group in the row of pixel units are conducted (i.e., T01 and 107 in FIG. 4 are conducted simultaneously), and these R sub-pixels are charged. In other words, data signal line MUXR(N) provides data signals to all R sub-pixels of the first group in the row of pixel units. The preset period ΔT is determined according to the driving capability of the driving IC, the resistance, capacitance, impedance of the display panel, and the dielectric coefficient of the display panel's material.

It should be noted that the division of sub-pixels of a same component colors are not limited to two groups only. Alternative embodiments of the present disclosure may divide the sub-pixels of a same component color into three or more than three groups. The number of data signal lines is therefore increased correspondingly. In these embodiments, each data signal lines charge respective groups of sub-pixels sequentially with preset time gaps, until all sub-pixels of the same component color in the row specified by GATE(N) are charged.

After all R sub-pixels in the row specified by GATE(N) are charged, data signal lines MUXR and MUXR(N) are reduced to low level. After a preset period Δt, the data signal line MUXG is raised to high level. Then, all thin film transistors (TFTs) that are connected to the G sub-pixels of the fourth group in the row of pixel units are conducted (i.e., T08 and T11 in FIG. 4 are conducted simultaneously), and these G sub-pixels are charged.

After the preset period ΔT, the data signal line MUXG(N) is raised to high level. Then, all thin film transistors (TFTs) that are connected to the G sub-pixels of the third group in the row of pixel units are conducted (i.e., T02 and T05 in FIG. 4 are conducted simultaneously), and these G sub-pixels are charged.

It should be noted that the division of G sub-pixels are not limited to two groups only. Alternative embodiments of the present disclosure may divide the G sub-pixels into three or more than three groups. The number of data signal lines is therefore increased correspondingly. In these embodiments, each data signal lines charge respective groups of G sub-pixels sequentially with preset time gaps, until all G sub-pixels in the row specified by GATE(N) are charged.

After all G sub-pixels in the row specified by GATE(N) are charged, data signal lines MUXG and MUXG(N) are reduced to low level. After a preset period Δt, the data signal line MUXB is raised to high level. Then, all thin film transistors (TFTs) that are connected to the B sub-pixels of the sixth group in the row of pixel units are conducted (i.e., T09 and T12 in FIG. 4 are conducted simultaneously), and these B sub-pixels are charged.

After the preset period ΔT, the data signal lute MUXB(N) is raised to high level. Then, all thin film transistors (TFTs) that are connected to the B sub-pixels of the fifth group in the row of pixel units are conducted (i.e., T03 and T06 in FIG. 4 are conducted simultaneously), and these B sub-pixels are charged.

It should be noted that the division of B sub-pixels are not limited to two groups only. Alternative embodiments of the present disclosure may divide the B sub-pixels into three or more than three groups. The number of data signal lines is therefore increased correspondingly. In these embodiments, each data signal lines charge respective groups of B sub-pixels sequentially with preset time gaps, until all B sub-pixels in the row specified by GATE(N) are charged.

After all B sub-pixels in the row specified by GATE(N) are charged, data signal lines MUXB and MUXB(N) are reduced to low level. After a preset period Δt, the driving signal line GATE(N) is lowered to low level, and the cycle of a row's charging is completed. Repeating the above process then can complete the entire display panel's charging.

It should be noted that what is shown in FIG. 4 is only exemplary and a person of the related art may adjust the driving circuit structure shown in FIG. 4 according to his requirement. For example, the number of driving signal line may be increased and two or more driving signal lines are employed to deliver display driving signals to the sub-pixels of multiple component colors in a row of pixel units of the display panel. Or the number of data signal lines may be increased and three or more data signal lines are employed to deliver display data signals to the sub-pixels of a same component color. In addition, a person of the related art may adjust the order of data signal lines' charging sub-pixels according to his requirement. Therefore, solutions employing at least two data signal lines to charge sub-pixels of a same component color should all fall within the scope of the present disclosure. For simplicity's sakes, these solutions are detailed here.

Figure 5:
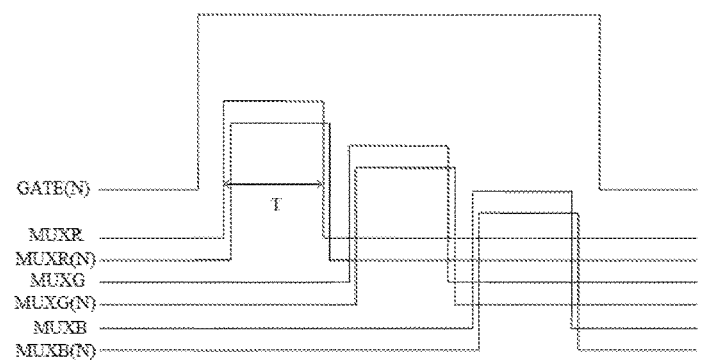
FIG. 5 is a timing sequence diagram showing the driving signal line GATE(N), data signal lines MUXR, MUXG, MUXG(N), MUXB, MUXB(N) of the driving circuit of FIG. 4.

FIG. 5 is a timing sequence diagram showing the driving signal line GATE(N), data signal lines MUXR, MUXR(N), MUXG, MUXG(N), MUXB, MUXB(N) of the driving circuit of FIG. 4.

As illustrated, during a high-level cycle of GATE(N), MUXR, MUXR(N), MUXG, MUXG(N), MUXB, MUXB(N) sequentially charge sub-pixels of corresponding component colors, respectively, starting from different points of time To charge the two groups of sub-pixels of a same component color, the two corresponding data signal lines have their charging periods overlapped. In FIG. 5, T denotes a charging period to a group of sub-pixels. It can be seen that the charging periods of MUXR and MUXR(N) are overlapped but their starting times are separated by a preset gap. Similarly, the charging periods of MUXG and MUXG(N) are overlapped but their starting times are separated by a preset gap, and the charging periods of MUXB and MUXB(N) are overlapped but their starting times are separated by a preset gap. By having at least two data signal lines to charge a group of sub-pixels of a same component color, respectively, with different starting times, the transient load, by becoming time-shared load, to the input signal is effectively reduced.

However, as shown in FIG. 5, the charging periods of data signal lines to sub-pixels of different component colors are not overlapped. That is, the charging periods of MUXR and MUXR(N), the charging periods of MUXG and MUXG(N), and the charging periods of MUXB and MUXB(N) are not overlapped with each other.

Figure 6:
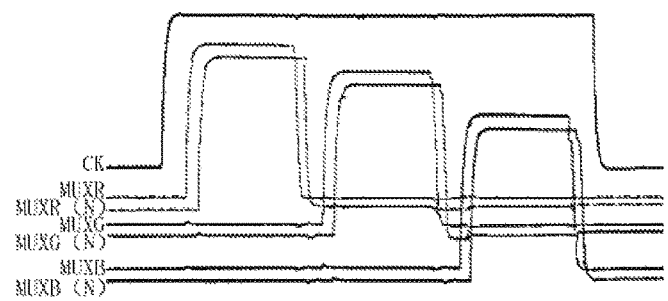
FIG. 6 is a waveform diagram showing the actual waveforms of the driving signal line GATE(N), data signal lines MUXR, MUXR(N), MUXG, MUXG(N), MUXB, MUXB(N) of the driving circuit of FIG. 4.

FIG. 6 is a waveform diagram showing the actual waveforms of the driving circuit of FIG. 4.

Figure 1:
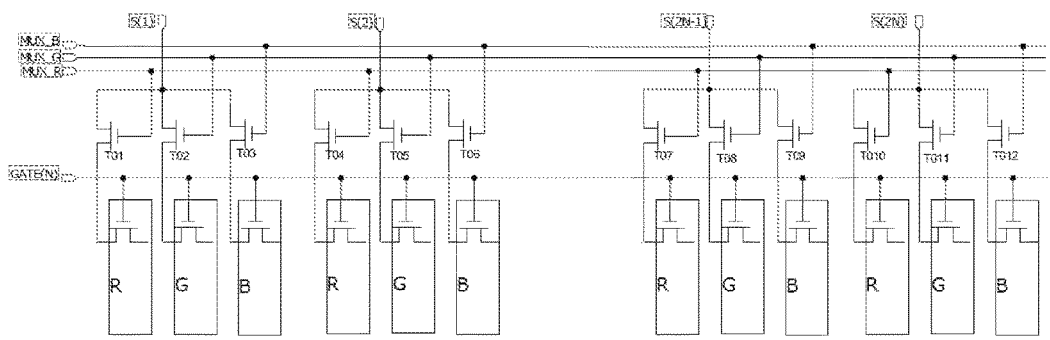
FIG. 1 is a schematic diagram showing a driving circuit for multiple sub-pixels of different component colors in a row of pixel units of an existing LCD.
Figure 2:
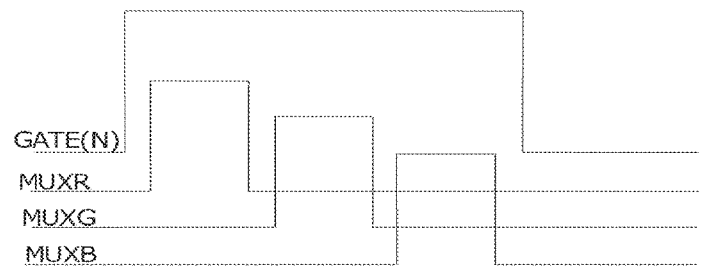
FIG. 2 is a timing sequence diagram showing the driving signal line GATE(N), data signal lines MUXR, MUXG, and MUXB of the driving circuit of FIG. 1.
Figure 3:
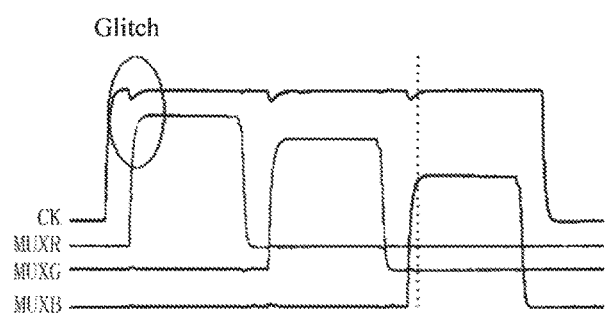
FIG. 3 is a waveform diagram showing the actual waveforms of the driving signal line GATE(N), data signal lines MUXR, MUXG, and MUXB of the driving circuit of FIG. 1.

In contrast to what is shown in FIG. 1 where glitches appear in the input signal when, in a row of pixel units, all sub-pixels of component color red share a single data signal line MUXR, all sub-pixels of component color green share a single data signal line MUXG, and all sub-pixels of component color blue share a single data signal line MUXB, FIG. 6 shows that the present disclosure effectively resolves glitches resulted from heavy transient load to input signal, thereby enhancing the quality of the input signal and the display quality as well.

Embodiments of the present disclosure have been described, but not intending to impose any unduly constraint to the appended claims. Any modification of equivalent structure or equivalent process made according to the disclosure and drawings of the present disclosure, or any application thereof, directly or indirectly, to other related fields of technique, is considered encompassed in the scope of protection defined by the clams of the present disclosure.

What is claimed is:

1. A driving circuit for a display panel, the display panel comprising a plurality of pixel units arranged in a pixel unit array, each pixel unit comprising a plurality of sub-pixels of a first component color, a second component color, and a third component color, respectively, the driving circuit comprising, for the sub-pixels in a row of pixel units:

at least a driving signal line delivering display driving signal to the sub-pixels through the driving signal line;

a first data signal line and a second data signal line connected to and delivering display data signal to a first group of sub-pixels and a second groups of sub-pixels, respectively, where the first and second groups of sub-pixels are separate groups of sub-pixels of the first component color;

a third data signal line and a fourth data signal line connected to and delivering display data signal to a third group of sub-pixels and a fourth groups of sub-pixels, respectively, where the third and fourth groups of sub-pixels are separate groups of sub-pixels of the second component color; and a fifth data signal line and a sixth data signal line connected to and delivering display data signal to a fifth group of sub-pixels and a sixth groups of sub-pixels, respectively, where the fifth and sixth groups of sub-pixels are separate groups of sub-pixels of the third component color;

wherein, during a period of time the driving signal line is at a high level, the first and second groups of sub-pixels are charged by the first and second data signal lines with a first charging period and a second charging period, respectively, the third and fourth groups of sub-pixels are charged by the third and fourth data signal lines with a third charging period and a fourth charging period, respectively, and the fifth and sixth groups of sub-pixels are charged by the fifth and sixth data signal lines with a fifth charging period and a sixth charging period, respectively;

during a period of time the driving signal line is at a high level, the first and second charging periods are overlapped but the second charging period is after the first charging period by a first gap, the third and fourth charging periods are overlapped but the fourth charging period is after the third charging period by the first gap, and the fifth and sixth charging periods are overlapped but the sixth charging period is after the fifth charging period by the first gap; and during a period of time the driving signal line is at a high level, the charging periods to sub-pixels of different component colors are non-overlapped, the third charging period is after the second charging period by a second gap, and the fifth charging period is after the fourth charging period by the second gap.

2. A display panel comprising a plurality of pixel units arranged in a pixel unit array, where each pixel unit comprises a plurality of sub-pixels of a first component color, a second component color, and a third component color, respectively; and a driving circuit as claimed in claim 1.

* * * * *